(12) United States Patent
Benedik

(10) Patent No.: US 9,957,047 B2
(45) Date of Patent: May 1, 2018

(54) WATER SCOOPING APPARATUS FOR FORESTFIRE SUPPRESSANT IN NON-AMPHIBIOUS AIRTANKERS

(71) Applicant: JABE BEHEER B.V., Beek (NL)

(72) Inventor: Jack Benedik, Beek (NL)

(73) Assignee: JABE BEHEER B.V., Beek (NL)

( * ) Notice: Subject to any disclaimer, the term of this patent is extended or adjusted under 35 U.S.C. 154(b) by 0 days. days.

(21) Appl. No.: 15/542,947

(22) PCT Filed: Jan. 12, 2016

(86) PCT No.: PCT/EP2016/050474
§ 371 (c)(1),
(2) Date: Jul. 12, 2017

(87) PCT Pub. No.: WO2016/113256
PCT Pub. Date: Jul. 21, 2016

(65) Prior Publication Data
US 2018/0002019 A1 Jan. 4, 2018

(30) Foreign Application Priority Data
Jan. 13, 2015 (NL) .................................. 2014126
Sep. 15, 2015 (NL) .................................. 2015444

(51) Int. Cl.
*B64D 1/00* (2006.01)
*B64D 1/22* (2006.01)
*B64D 1/16* (2006.01)

(52) U.S. Cl.
CPC .................................. *B64D 1/22* (2013.01);
*B64D 1/16* (2013.01)

(58) Field of Classification Search
CPC ............ B64D 1/16; B64D 1/22; A62C 3/0228
See application file for complete search history.

(56) References Cited

U.S. PATENT DOCUMENTS 1,911,431 A * 5/1933 Cawley .................... B64D 1/16
244/136
2,117,234 A 5/1938 Austin et al.
(Continued)

FOREIGN PATENT DOCUMENTS

FR 1481100 5/1967
FR 2512775 A1 3/1983
(Continued)

*Primary Examiner* — Philip J Bonzell
(74) *Attorney, Agent, or Firm* — Hudak, Shunk & Farine Co. LPA

(57) ABSTRACT

A water scooping apparatus for an aircraft comprising an extendible tubular member having a first end and an opposite end, wherein the first end is pivotally attached to the aircraft, a duct for fluidly connecting the extendible tubular member at the first end to a water tank, a floater connected to the opposite end of the extendible tubular member, wherein the floater is provided with an intake opening for taking in water; wherein the intake opening is fluidly connected to the extendible tubular member; wherein the water scooping apparatus is operable between a resting position in which the extendible tubular member is substantially retracted, and an operating position in which the extendible tubular member extends downwards from the aircraft at an angle.

14 Claims, 6 Drawing Sheets

(56) References Cited

U.S. PATENT DOCUMENTS

| | | | | |
|---|---|---|---|---|
| 6,644,595 B2* | 11/2003 | Ramage | ............... | A62C 3/0228 |
| | | | | 169/53 |
| 6,874,734 B2* | 4/2005 | Ramage | ............... | A62C 3/0228 |
| | | | | 169/53 |
| 7,690,600 B2* | 4/2010 | Olive | ..................... | B64D 1/16 |
| | | | | 244/136 |
| 2001/0054669 A1* | 12/2001 | Ramage | ............... | A62C 3/0228 |
| | | | | 244/136 |
| 2002/0125016 A1* | 9/2002 | Cofield | ................ | A62C 3/0242 |
| | | | | 169/53 |
| 2005/0045770 A1* | 3/2005 | Ramage | ............... | A62C 3/0228 |
| | | | | 244/136 |
| 2007/0164162 A1* | 7/2007 | Olive | ..................... | B64D 1/16 |
| | | | | 244/136 |
| 2010/0178176 A1* | 7/2010 | Kenyon | .................. | B64D 1/16 |
| | | | | 417/53 |
| 2016/0229535 A1* | 8/2016 | Doten | .................... | A62D 1/0064 |
| 2016/0375284 A1* | 12/2016 | Doten | .................. | A62C 3/0235 |
| | | | | 169/44 |
| 2017/0065841 A1* | 3/2017 | Doten | .................. | A62C 3/0235 |
| 2017/0183098 A9* | 6/2017 | Doten | .................. | A62D 1/0064 |

FOREIGN PATENT DOCUMENTS

| | | |
|---|---|---|
| GB | 2163710 A | 3/1986 |
| WO | 0169058 A2 | 9/2001 |

* cited by examiner

WATER SCOOPING APPARATUS FOR FORESTFIRE SUPPRESSANT IN NON-AMPHIBIOUS AIRTANKERS

FIELD OF THE INVENTION

The invention relates to a water scooping apparatus for a conventional aircraft that can be used to extinguish forest fires, to an aircraft equipped with such a water scooping apparatus and to a method of filling water tanks on board of such an aircraft.

BACKGROUND OF THE INVENTION

Aircrafts that can be used to extinguish fires are known in the art. Examples of such aircrafts are amphibious Canadair forest fire fighter. These so-called "Canadair" aircrafts are dedicated to fighting forest fires or wildfires and search and rescue in case of disaster on sea, due to the ability to land on water surface. These aircrafts are able to fill the installed water tanks while flying over a body of water with the hull of the aircraft skimming the water surface. They can for example fill the water tanks with 6100 liter of water in 12 seconds. To the taken in water additives can be added such as foam forming compounds, or gel to form a liquid fire suppressant. The additives improve the fire suppressing action. After taking in water, the aircraft can take off, fly to the forest fire and drop the content of the water tanks on or near the burning area while flying at low altitude.

By repeating this manoeuvre the forest- or wildfire can be extinguished. A tactical way of firefighting is to spread a wide path or blanket of liquid fire suppressant i.e. water in front of a forest fire by means of multiple droppings, blocking the way for the forest fire to spread out in the direction of the wind.

A disadvantage of such aircrafts is that they are dedicated to this activity and can only be used for extinguishing fires and rescues on high sea. Furthermore they need to contact the water, and usually have only a limited capacity of about 6000 liters of water to release above a fire.

Conventional, non-amphibious aircrafts which contain water tanks, so-called airtankers, may have a larger storage capacity (about 10.000-30.000 liters), but they are not equipped to pick up water from water surfaces like sea, rivers and lakes. They generally need to land at an airport, refill the water tanks and take off again. This takes a large amount of time and only one run and drop of liquid fire suppressant can be achieved per hour. In addition the fuel cost is higher and an efficient method of extinguishing of forest fires (total cost/liters per hour) cannot be reached.

In the art, for example as described in British published patent GB2163710, aircraft are known which are equipped with apparatus for scooping up water. The described aircraft has a boom pivoted at its forward end to the underside of the aircraft's fuselage and having at its rear end a scoop connected via a duct in the boom to a water storage tank mounted in the fuselage. When the aircraft is flying closely above the surface of a body of water, the boom may be lowered to dip the scoop into the water to thereby refill the tank. The scoop can be equipped with a hydrofoil to guide the scoop through the water surface. Such scoop and hydrofoil however have an undefined position with respect to the water surface and may exhibit uncontrolled downward movement when pulled through a water surface, thereby endangering the aircraft to be pulled down and its pilot.

SUMMARY OF THE INVENTION

It is an object of the invention to provide an improved way of taking-in water into an aircraft provided with water tanks.

The object is achieved in a water scooping apparatus for an aircraft comprising an extendible tubular member having a first end and an opposite end, wherein the first end is pivotally attached to the aircraft, a duct for fluidly connecting the extendible tubular member at the first end to a water tank, a floater connected to the opposite end of the extendible tubular member. The floater is provided with an intake opening at its opposite end for taking in water, wherein the intake opening is fluidly connected to the lower end of the extendible tubular member, wherein the water scooping apparatus is operable between a resting position in which the extendible tubular member is substantially retracted, and an operating position in which the extendible tubular member extends downwards from the aircraft at an angle.

The pivotal connection of the tubular member to the aircraft and the extendible tubular member allows the water scooping apparatus to be operable between the resting position and the operating position. The pivotal attachment of the extendible tubular member also allows in operation altitude variations of the aircraft relative to the water surface. The pivotability of the extendible tubular member allows an optimal angle to be assumed between the extendible tubular member and the aircraft for pulling the floater at a given altitude of the aircraft. High waves may require a higher altitude than lower waves for example.

The floater once lowered into the water provides an upward force, i.e. buoyancy thereby preserving the opposite end of the extendible tubular member, i.e. intake opening in a defined position in the water surface at a working depth. It prevents the floater from going too deep and pulling the aircraft down.

The term 'at an angle' is understood to mean that the extendible tubular member is oblique with respect to the longitudinal axis of the fuselage. The angle between the extendible tubular member and the longitudinal axis of the fuselage is preferably 20 to 70 degrees, more preferably 40 to 45 degrees.

The water scooping apparatus can be installed underneath an aircraft, which can be a conventional non-amphibious aircraft, with the intention to scoop water from sea, lake or river or any other body of water in order to suppress forest fire or wildfire. The water scooping apparatus can for example also be installed inside a conventional aircraft, provided it has an access door or hatch in the fuselage from where the water scooping apparatus can be deployed outside the aircraft to skim the water surface and to scoop water.

The water scooping apparatus can be installed permanently, or can be dismantled for a seasonal period after the forest-fire high-risk season. It allows a conventional non-amphibious aircraft to scoop water from a body of water flying at an altitude between 1 meter to 18 meters above the water surface, preferably between 5 and 15 meters above the surface of the water.

The water scooping apparatus can be installed in different types of aircrafts. For example in small aircrafts SEAT (Single Engine Air Tanker or Air Tractor AT-802) which are normally used for crop spraying, to medium-size airtankers like for example the Neptune P-2H, or Large Air Tankers (LAT) like for example the Hercules C-130 and finally the Very Large Airtankers (VLAT) like for example the DC 10.

In an embodiment, the floater can have a V-shaped body in a vertical cross section, like for example a high speed speedboat, with a sharp bow and a stern in order to land the device smoothly on the water surface and sustain a high speed required for the aircraft to remain airborne and a steady course through the water. The sharp bow can for example have an axe-shape.

In an embodiment, the intake opening is positioned underneath the floater facing the bow. The intake opening is arranged to scoop the water from the water surface. This allows the water scooping apparatus to scoop water using the forward thrust of the aircraft to which the water scooping apparatus is attached.

In an embodiment, the intake opening has an intake-valve. This prevents water taken in to flow back when the floater is lifted from the water surface.

In an embodiment, the floater is provided with a hydrofoil mounted underneath the floater near the stern, wherein the hydrofoil has an angle of engagement with the water, and the angle of engagement is chosen to create a downward force. The downward force of the hydrofoil causes the floater to stay in the water. The position near the stern prevents the floater from diving with its bow into the water surface. The floater buoyancy creates an upward force when lowered into the water.

In operation, when the floater is pulled through the water by the aircraft, the downward force by the hydrofoil pulls the floater down into the water until it is balanced with the upward force, i.e. floater buoyancy. As the hydrofoil is mounted near the stern, the downward force may also compensate a torque caused by the intake opening resistance in the water, pushing the bow of the floater down. This results in a passive, stable and safe scooping position of the floater, preventing it from going any deeper. It can scoop the highest volume of water in the shortest period of time with the lowest forces on the aircraft.

In an embodiment, the floater is provided with an airfoil mounted at a high end of the floater near the bow, wherein the airfoil has an angle of engagement with the air, and the angle of engagement is chosen to create a downward force while descending from the aircraft.

The airfoil causes the floater to be forced downwards and stabilizes the floater, whilst being airborne.

In an embodiment, the airfoil is collapsible to the floater, so that while the floater is above the water the airfoil is deployed, whereas when the floater is in the water, the airfoil is collapsed to prevent damage from waves.

In an embodiment, the extendible tubular member comprises an extendible pipe with at least one extension pipe. The extendible tubular member can have extension means for driving the at least one extension pipe. The extendible pipe can be mounted to the aircraft with a hinge for the pivoting action necessary to extend the pipe downwards with an angle relative to the aircraft. The pipe can be provided with extension means such as rods to extend mechanically. The pipe can also be extended hydraulically. A drive or hydraulic pump allows the extending of the pipe.

In an embodiment, the extendible pipe is a telescopic pipe. The telescopic pipe can have multiple segments. This allows the extendible pipe to be housed in a space within the aircraft fuselage.

In an embodiment, the extendible tubular member comprises at least one hose, and the water scooping apparatus further comprises means for releasing and retracting the at least one hose. By releasing and retracting the at least one hose, the at least one hose can extend from the aircraft and be retracted after use. The flexibility of the at least one hose provides the hinge action allowing the hose to extend from the aircraft and assume an angle relative to the aircraft.

In a further embodiment, the extension means for releasing and retracting the hose comprise a reel, and wherein the at least one hose are rolling onto and unrolling from the reel. The rolling or unrolling of the at least one hose around the reel provides the hinge action allowing the hose to extend from the aircraft and assume an angle relative to the aircraft. Moreover, the main axle of the reel can freely rotate and allow the aircraft to fly at different altitudes, preferably between 5 and 15 meters.

A hose rolled up onto the reel provides a space saving solution for housing the water scooping apparatus. The reel with hose can be accommodated inside the aircraft fuselage in a compartment for example underneath a loading floor. The compartment can be covered with a door or hatch. Thus when the scooping device is not in use, the aircraft can fly without air resistance due to parts extending outside the fuselage.

In an embodiment, the extendible tubular member further comprises lifting means for moving the floater in and out of the operating position and holding the floater in the operating position.

This allows the at least one hose to be manufactured from relatively light material wherein the mechanical force to lift the extendible tubular member and floater is relieved by means of the lifting means.

The object is also achieved according to another aspect of the invention in an aircraft comprising a fuselage comprising a water tank, wherein the aircraft is further provided with a water scooping apparatus as described. The water scooping apparatus is attached to a reinforced frame of the aircraft fuselage, for example underneath the aircraft, via a hinge member. The water scooping apparatus is fluidly connected to the water tank via the duct The water scooping apparatus can be installed underneath any aircraft, including conventional non-amphibious aircrafts, to provide the ability to scoop water from sea, lake or river or any other body of water in order to suppress forest fire or wildfire.

The hinge member can be mounted underneath the aircraft and connected directly to a for this purpose reinforced frame (skeleton) of the aircraft.

The object is also achieved according to another aspect of the invention in a process for filling water tanks of an aircraft as described. The process comprises flying above a water surface at an altitude between 1 and 18 meters, preferably between 5 and 15 meters, extending the extendible tubular member until the floater touches the water surface, and taking in water.

After filling the tanks with water the extendible tubular member can be retracted and moved into a resting-position. The water scooping apparatus in resting position underneath the aircraft can then be covered by a hatch.

DETAILED DESCRIPTION OF THE INVENTION

Figure 1:
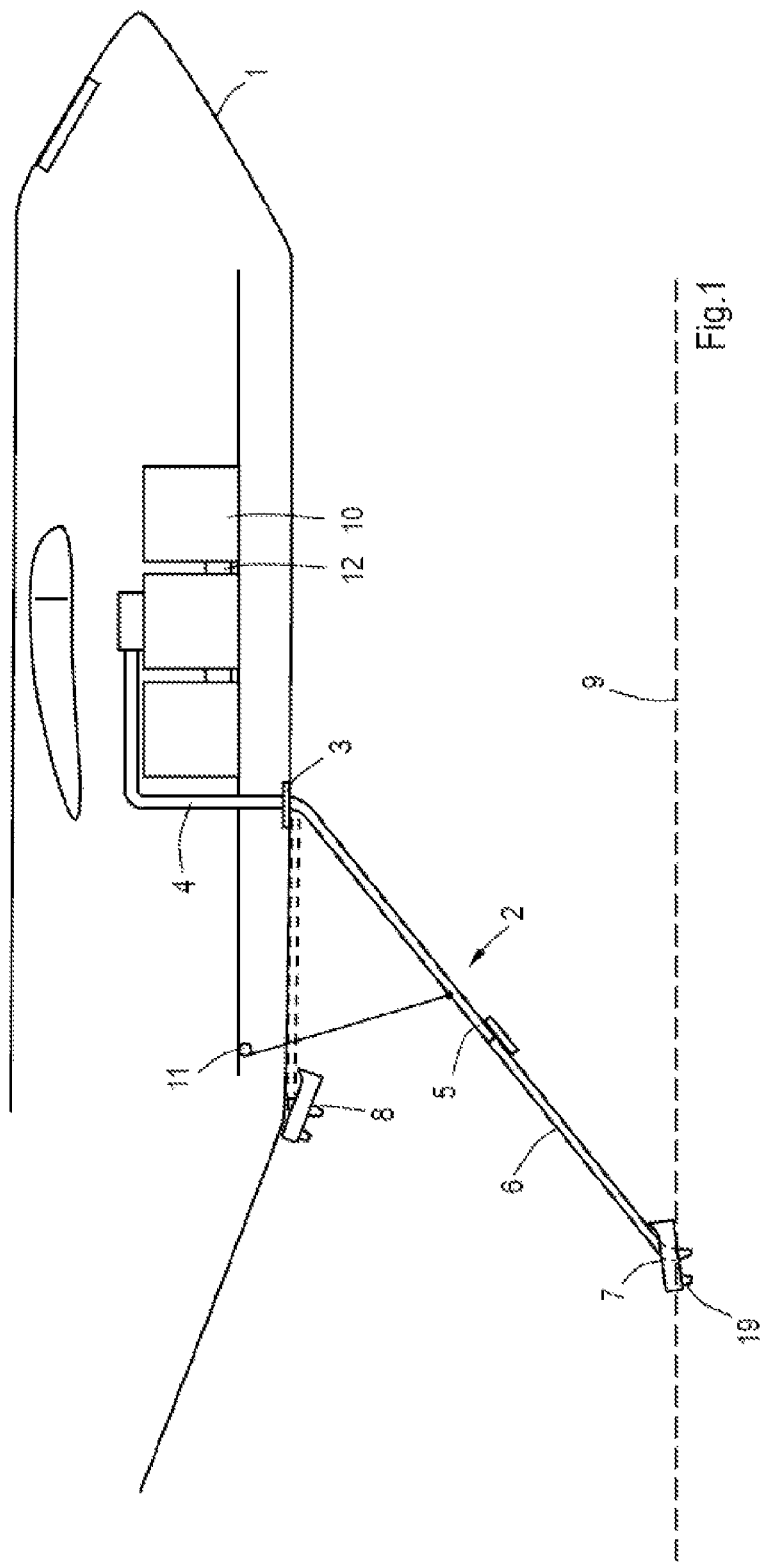
FIG. 1 shows an example of a water scooping apparatus according to an embodiment of the invention mounted underneath an aircraft comprising telescopic pipes.

The water scooping apparatus as shown in FIG. 1 in resting-position 8, can be mounted underneath an aircraft 1 or airtanker, e.g. a conventional non amphibious aircraft 1.

The aircraft 1 may have installed water tanks 10 which can for example contain 10.000 to 30.000 liters or more of liquid fire suppressant, i.e. water. These water tanks are interconnected by wide-dimensional ducts 12 in order to maintain a steady balance of the aircraft 1 during high-speed filling. An airtanker is able to drop the content of these tanks in a very short time, varying from 4 to 8 seconds, on a forest fire.

The water tanks 10 are connected to a filling pipe or duct 4 which is connected to an extendible pipe 5. The extendible pipe 5 is connected to a hinge 3. The hinge 3 can be mounted on a frame which is mounted in the aircraft 1. The hinge 3 can also be mounted directly inside the aircraft 1 and connected with the for this purpose reinforced main frame or fuselage 14 of the aircraft 1.

When the water scooping apparatus 2 is in operating position, the floater 7 being pulled by the aircraft 1 and floating on the water surface 9 will maintain a steady, passive, stable and safe position in the water surface 9, while the aircraft 1 may be varying in altitude with respect to the water surface.

The main pipe 5 which is connected to the hinge 3, is extendible by at least one extension pipe 6. The extension pipe 6 can have an outer diameter to fit inside the extendible main pipe 5. The extension pipe 6 is attached to a floater 7. The extension pipe 6 is provided with an intake opening (see reference numeral 20 in FIG. 4), which may have an intake-valve. Once the floater 7 with intake-opening enters the water-surface 9 the water will pass through the intake opening and enter the said water tanks under high pressure, as shown in FIG. 1. The intake valve can be gradually opened to allow a controlled inflow of water once the floater 7 has engaged the water surface 9.

Figure 2:
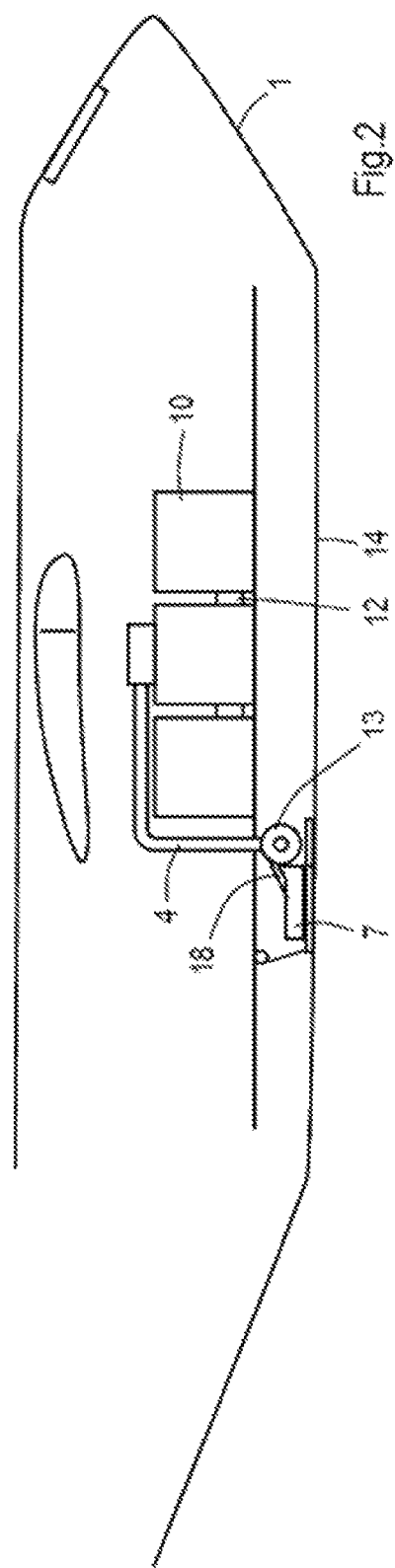
FIG. 2 shows another example of a water scooping apparatus according to an embodiment of the invention comprising a hose on a reel and the floater mounted inside an aircraft in a resting position.

As shown in FIG. 2, the extendible tubular member can alternatively comprise a hose 18. The hose 18 can be made from a reinforced material comprising for example Dyneema™ fibre or a similar material. The hose 18 in resting position in FIG. 2 can be rolled onto a reel 13 which is mounted inside the aircraft 1. The floater 7 can be accommodated on a slide 17. Reel 13 and floater 7, parked on the slide 17 can be accommodated within the fuselage 14 of the aircraft 1.

The hose 18, or multiple hoses 18, can be accompanied by one or more cables (not shown in FIG. 2) for lifting or hoisting the floater 7 from its resting position to operating position and vice versa. The one or more cables also allow relieving the hose 18 from the tensile force exerted by the aircraft to the floater in operating position.

Figure 3:
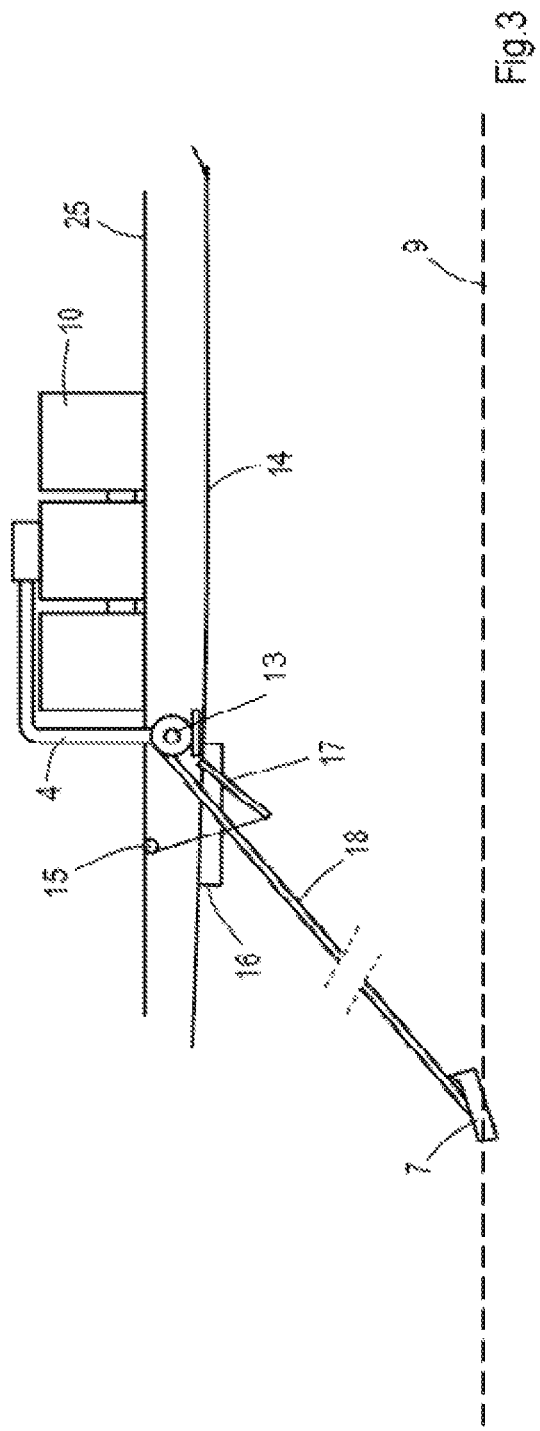
FIG. 3 shows the water scooping apparatus of FIG. 2 in an operating position.

In FIG. 3 the hose 18 is shown in rolled off position. The reel 13 causes the hose 18 to be extendible, and also provides the hinge action, as the hose can swing around the reel central axis in a vertical plane extending from the front of the aircraft 1 to the rear. The flexibility of the hose 18 can also contribute to the hinge action. The end of hose 18 at the reel 13 is connected to duct 4 via a water tight bearing, thus connecting the hose 18 to the water tanks 10. At the opposite end of the hose the floater 7 is attached to the hose 18.

For the scooping sequence to begin, the floater 7 is released from the aircraft 1 by opening hatch 16 and lowering slide 17. In this lowered position, the hose 18 can be unrolled from reel 13. The airflow underneath the airplane will position the floater 7 relative to the airplane 1 as shown in FIG. 3. The moving of the slide 17 can be performed for example by means of a winch with a cable attached to a free side of the slide 17. The slide 17 can be lowered by releasing the cable from the winch 15.

The hose 18 is pivotally attached to the floater 7 and on the other end the main axle/tube of the reel can freely rotate, which allows the aircraft 1 to fly at an altitude between 6 and 20 meters, while the floater 7 remains in perfect scooping position. The diameters of the hose 18 and the duct 4 from the reel 13 to the holding tanks is chosen to allow high speed-filling and the wide-dimensional ducts in-between the water tanks 10 ensure equal filling and consequently balance and stability to the aircraft 1 during the process.

Figure 4:
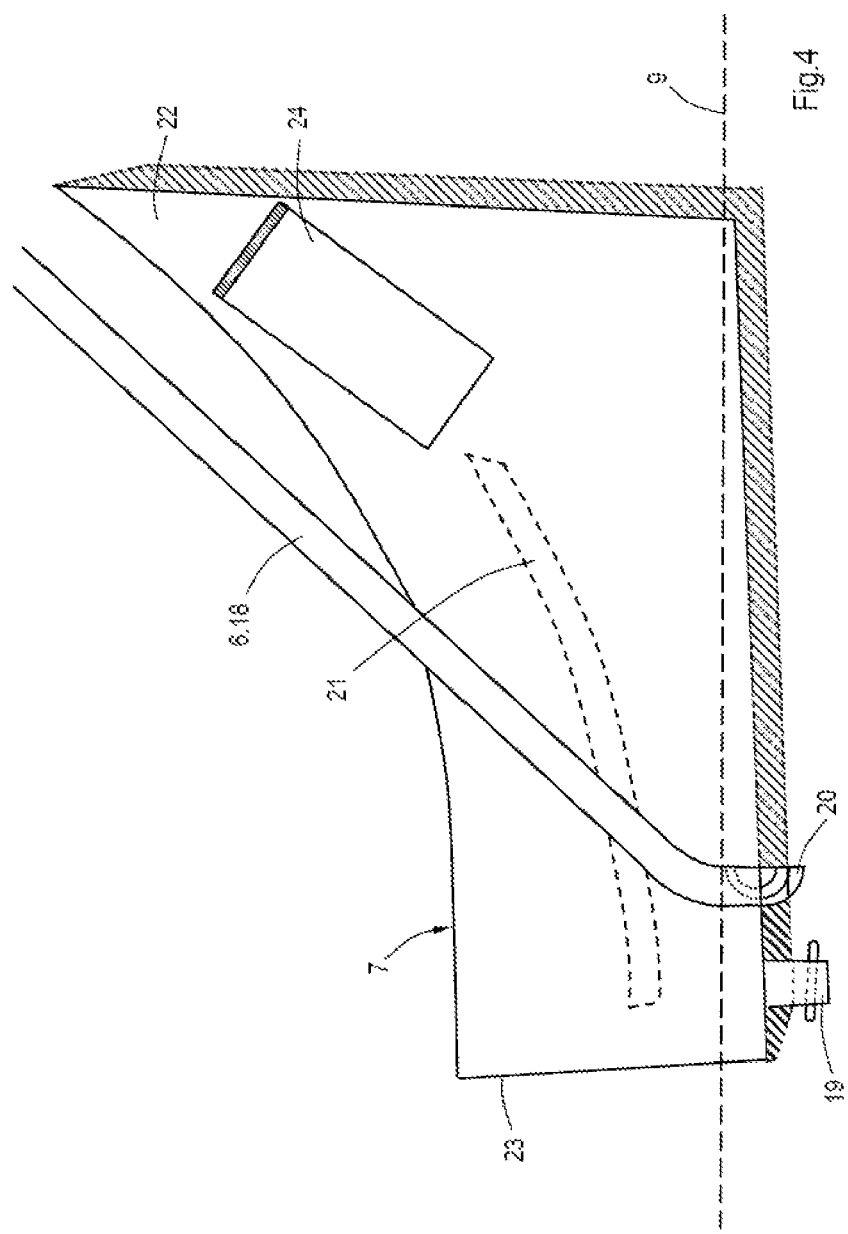
FIG. 4 shows a side view of a floater of the water scooping apparatus according to an embodiment of the invention.

In FIG. 4 the floater 7 is shown. The floater 7 preferably has a V-shaped body viewed in a vertical cross section and a high and sharp-constructed bow 22 which will split the water surface 9 and water mass below it, allowing the floater 7 to enter the water surface at high speed and maintain a steady position whilst in operation being pulled by the aircraft through the water as described before without causing too much pressure or stress on the aircraft 1. This is for example achieved with an axe bow as shown in FIG. 4.

At both sides of the floater 7 spray-spoilers 21 can be mounted to deflect bow-waves and spray sideways in order to reduce the pressure.

The stern 23 is also designed in a way to lead the water smoothly away from the floater in order to cause less stress on the aircraft 1. The stern 23 can for example also be V-shaped both in a horizontal cross-section as well as in a vertical cross section of the floater 7. The intake opening 20 is connected with the said pipe and the water tanks.

The floater 7 is provided with an airfoil 24 near its bow 22. The airfoil 24 is positioned to create a downward force, for example by tilting it downward in the forward direction of the floater 7, and forces the floater 7 downwards in a stable way to the water surface 9. After touch-down the airfoil 24 may be collapsed and folded to away, inside the floater 7 or to the sides of the floater 7. The airfoil 24 can be collapsible and foldable into a recess of the floater 7. The airfoil 24 is deployed while lowering the floater 7 from the aircraft 1. When the floater 7 engages the water surface 9, the airfoil 24 is preferable collapsed to prevent waves from damaging the airfoil 24.

The floater 7 can be provided with a hydrofoil 19 underneath the floater 7 near its stern 23. The hydrofoil 19 creates a downward force, whereas the floater buoyancy creates a upward force when pulled by the aircraft 1 and hose 18 through the water surface 9. The hydrofoil 19 is for example tilted downward in a forward direction of the floater 7. In this way the floater 7 is forced into a passive, stable and safe scooping position at an angle of about 40 degrees relative to the aircraft 1.

The extendible pipe 5, 6 or hose 18 can extend through the floater 7 to be connected with the intake opening 20. Alternatively, a passage can be made extending through the floater body wherein the passage is pivotally connected to the extendible pipe 5, 6 or hose 18 at its upper end and the intake opening 20 is connected to its lower end. The connection of the extendible pipe 5,6 or hose 18 can also be a flexible connection. The pivotal or flexible connection allows free movement of the floater 7.

Figure 5:
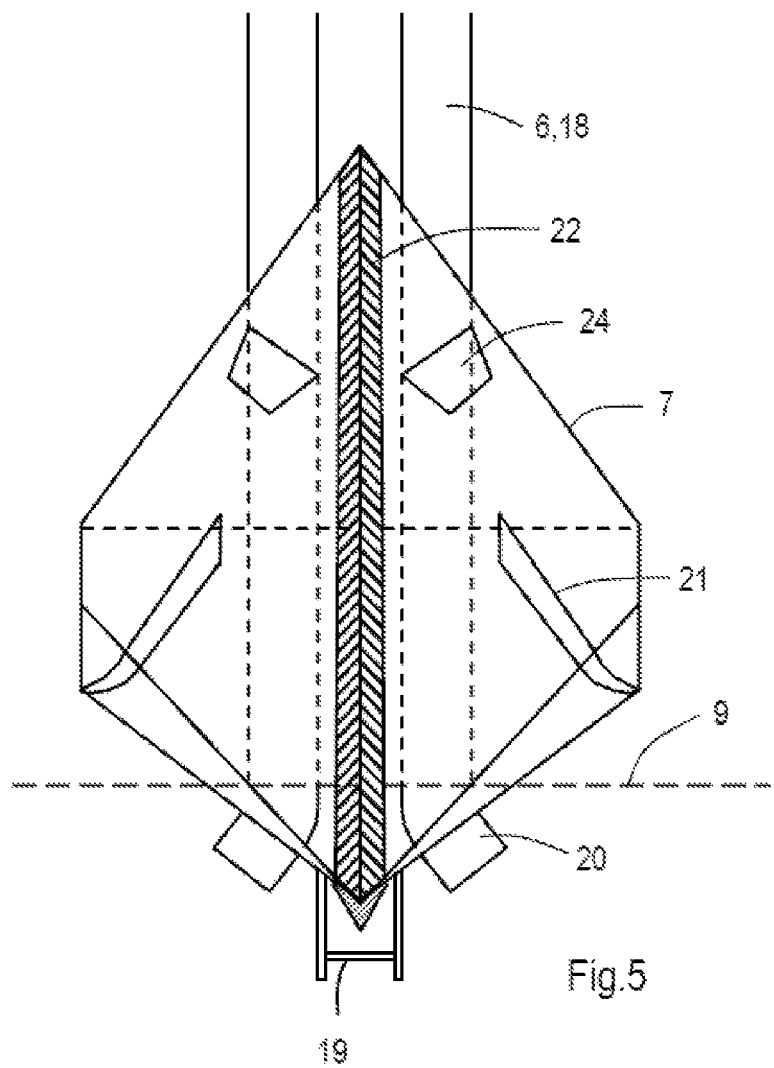
FIG. 5 shows a front view of the floater of the water scooping apparatus according to an embodiment of the invention.

In FIG. 5 is shown the floater 7 in front view of the bow 22 with two pipes 6 or hoses 18 in case of high volume airtankers. The intake-opening 20 is shown in front view as well as the spray-spoilers 21.

Figure 6:
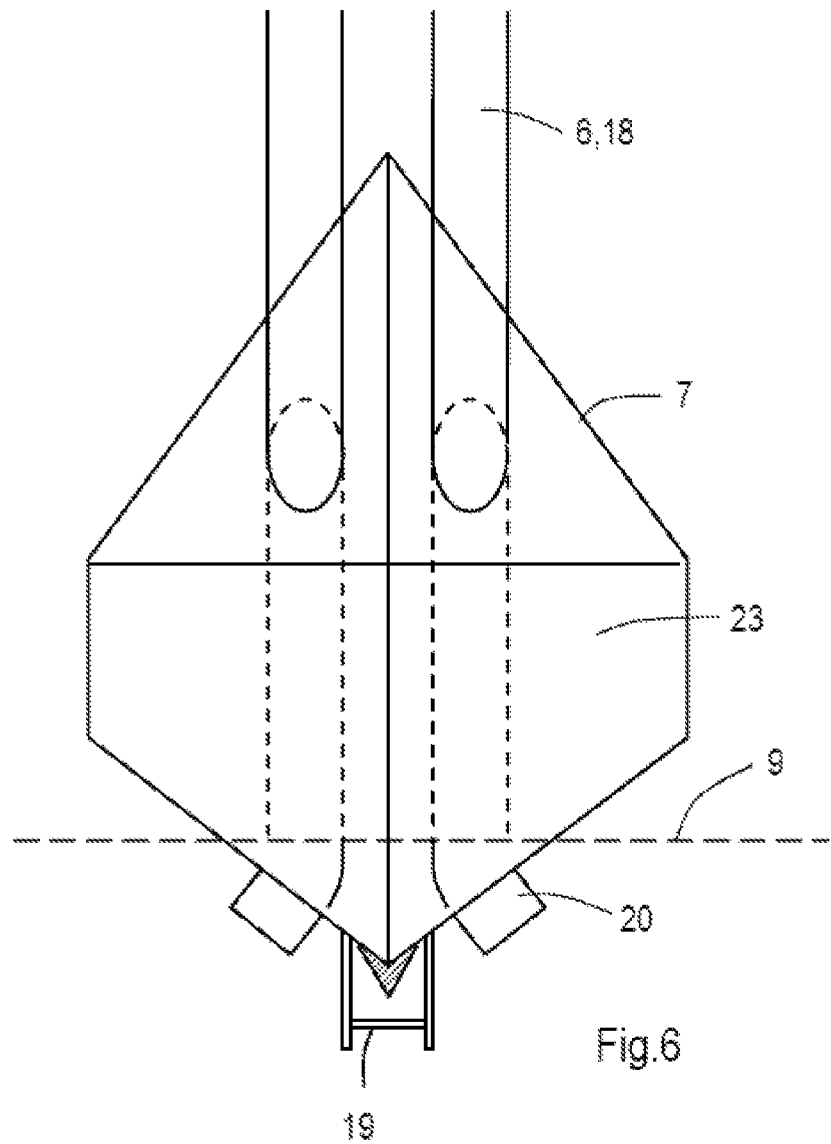
FIG. 6 shows a rear view of the floater of the water scooping apparatus according to an embodiment of the invention.

In FIG. 6 the floater 7 is shown from the rear with the stern 13 in front.

The scooping capacity of the water scooping apparatus 2 is determined by the diameter of the hose 18, by the surplus-power of the engines and loading-capacity of the aircraft 1. An overflow valve can be installed in the water tanks 10 to avoid overloading. After filling the water tanks 10 the overflow valve can be closed, the hose 18 rolled onto the reel 13 and the floater 7 can resume its resting position and the hatch is closed. In case of higher volumes the water scooping apparatus 2 can comprise two or more hoses 18 instead of one.

The embodiments described above are given by way of example. Variations are possible without departing from the scope of protection provided by the claims below.

REFERENCE NUMERALS 1 aircraft
2 water scooping apparatus
3 pivotal connection
4 duct
5 extendible pipe
6 extension pipe
7 floater
8 water scooping apparatus in resting position
9 water surface
10 water tanks
11 actuator
12 water tank connection duct
13 reel
14 fuselage
15 hatch
16 winch
17 slide
18 hose
19 hydrofoil
20 intake opening
21 spray spoiler
22 axe bow
23 stern
24 airfoil

What is claimed is:

1. A water scooping apparatus for an aircraft, comprising:
    an extendible tubular member having a first end and an opposite end, wherein the first end is pivotally attachable to the aircraft;
    a duct for fluidly connecting the extendible tubular member at the first end to a water tank;
    a floater connected to the opposite end of the tubular member, the floater having buoyancy for in use remaining buoyed on a water surface;
    wherein the floater is provided with an intake opening for taking in water, wherein the intake opening is positioned underneath the floater;
    wherein the intake opening is fluidly connected to the extendible tubular member;
    wherein the water scooping apparatus is operable between a resting position in which the extendible tubular member is substantially retracted, and in an operating position in which the extendible tubular member extends downwards from the aircraft at an angle.

2. The water scooping apparatus according to claim 1, wherein the intake opening is provided with an intake valve.

3. The water scooping apparatus according to claim 1, wherein the floater is provided with a hydrofoil mounted underneath the floater near a stern, wherein the hydrofoil is mounted having an angle of engagement with water, and wherein the angle of engagement is chosen to create a downward force.

4. The water scooping apparatus according to claim 1, wherein the floater comprises a V-shaped body having a bow and a stern.

5. The water scooping apparatus according to claim 4, wherein the floater is provided with an airfoil attached to the floater near the bow, wherein the airfoil has an angle of engagement with air, and the angle of engagement is chosen to create a downward force during descent of the floater to the water surface.

6. The water scooping apparatus according to claim 4, wherein the intake opening is arranged facing the bow.

7. The water scooping apparatus according to claim 1, wherein the extendible tubular member comprises an extendible tube having at least one extension pipe.

8. The water scooping apparatus according to claim 7, wherein the extendible tube is a telescopic pipe.

9. The water scooping apparatus according to claim 1, wherein the extendible tubular member comprises at least a hose, and wherein the water scooping apparatus further comprises means for releasing and retracting the at least one hose.

10. The water scooping apparatus according to claim 9, wherein the means for releasing and retracting of the hose comprise a reel, the reel being arranged for rolling the hose onto the reel and for unrolling the hose from the reel.

11. The water scooping apparatus according to claim 10, wherein the extendible tubular member further comprises lifting means arranged for moving the floater in and out of the resting position and for keeping the floater in the operating position.

12. An aircraft comprising a fuselage comprising a water tank, wherein the aircraft is further provided with a water scooping apparatus according to claim 1, wherein the water scooping apparatus is attached to a reinforced frame of the aircraft via a hinge member, wherein the water scooping apparatus is fluidly connected to the water tank via the duct.

13. A method for filling water tanks of an aircraft according to claim 12, comprising:
    flying over a water surface at an altitude in a range of 1-18 meter;
    extending the extendible tubular member until the floater touches the water surface;
    taking in water from the water surface via the intake opening.

14. The method according to claim 13, wherein the altitude is in a range of 5-15 meter.

* * * * *